've# 3,076,698
FLUIDIZED PETROLEUM ADDITIVES
John W. Orelup, Short Hills, N.J. (% Patent Chemicals Inc., 335 McLean Blvd., Paterson 4, N.J.)
No Drawing. Filed Sept. 30, 1960, Ser. No. 59,513
12 Claims. (Cl. 44—59)

This invention relates to pourable paste concentrates, and more particularly to pourable paste concentrates which are to be used as additives to petroleum products or other liquids. The pourable pastes of the present invention provide excellent means whereby petroleum additives such as dyes, antioxidants, gum inhibitors, anti-rust compounds, etc., may be rapidly and completely distributed through a large volume of petroleum material. The pourable pastes of the present invention have particular application in the distribution of a small quantity of a petroleum additive and, particularly of a dye, through a large volume of petroleum material. More particularly, they are especially useful in coloring gasoline, "ethyl fluid," and lubricating oils. "Ethyl fluid" is essentially tetraethyl-lead which may contain ethylene dichloride and an ethylene dibromide as well as anti-oxidants, stabilizers, anti-gumming compounds, etc.

To produce uniform distribution and rapid solution of a powdered petroleum additive, for example powdered dyes, in petroleum, it is necessary that the particle size of the dye or other powder be very small. As the particle size of the dyestuff is decreased, the air float properties of the dyestuff increase and the handling of this material is very troublesome. Opening the drum, shoveling, scooping, weighing, especially in a draft of air, may cause colored dust to cover the operator, his clothing and skin. There is objectionable coloring of other products, valves, apparatus, etc., and wastage.

There have been three standard systems of handling powdered colors: (A) the dye pot method, whereby the dye is added to the dye pot vessel containing undyed gasoline and circulated to form a concentrated solution or suspension which is then added to the main body of liquid to be colored; (B) a whole dye drum is dumped, shoveled or supported in a steel basket which is placed in a stock solution tank containing a solvent having higher solvent properties than the gasoline or other products to be colored. The cost of the solvents used to prepare these stock solutions is, for the most part, greater than the cost of the dye, as the highest solubility obtained, even with excellent solvents, is of the order of 2–3%; (C) a dry dye eductor system in which the powdered dye container is placed upon weighing scales and a vacuum aspirator system sucks up the powdered dye through a flexible hose introducing it into a blending tank. This method is successful where very large facilities are available, but it is ineffective in the coloring of viscous products, as for instance, lubricating oil. This method is troublesome where the powered dye has become caked by long storage, exposure to heat, or packing down by jolting in shipping.

A very fine particle size can be achieved without dusting, by grinding the commercial powdered dye in a liquid medium, as for instance a light lubricating oil. A very concentrated paste can be prepared in this way. However, after a short time these pastes thicken so that they do not flow. Moreover, after this thickening has occurred, the paste will clot when added to a large volume of gasoline or oil, defeating the entire purpose of securing rapid uniform distribution and fast solubility.

I have found that certain substances, even when added in a relatively small proportion to a paste comprising a hydrocarbon liquid medium and a powdered additive for petroleum, will prevent this thickening and will maintain a liquid or pourable paste which can be metered, pumped and treated as a liquid.

The action of these added substances is not that of a solvent; in fact, they are rather poor solvents. If solubilizing materials are added, a dull colored heavy-bodied material results which is useless. The same thickening occurs on aging when no liquefying or stabilizing agent is present. The thickening of the paste, and particularly the dye paste, appears to be caused by a crystallization or enlacement of crystal particles. The substances which I propose displace the air and moisture film on the dye particle and prevent crystal growth. A 25–30% solid content paste can be made which is pourable.

The problem described above with regard to addition of powdered dyes to petroleum materials also exists in connection with the addition of other powdered additives such as antioxidants, gum inhibitors and anti-rust compounds to petroleum or other materials. It has been found that the addition of $C_3$ to $C_{24}$ alkylated benzenes to pastes comprising a hydrocarbon liquid medium, e.g., lubricating oil, and a powdered additive for petroleum materials will prevent the paste from thickening and will maintain it in a liquid or pourable form which can be metered and pumped and otherwise treated as a liquid. More particularly, the $C_3$ to $C_{24}$ alkylbenzenes are suitable for this purpose. The preferred alkylated benzenes are the $C_{12}$ benzenes.

The alkylbenzenes that are useful in the present invention may be either the monoalkylated or polyalkylated compounds. They may also comprise a mixture of alkylated benzenes containing different alkyl substituents, provided that they meet the definition of the alkylbenzene set forth above.

Among the alkylbenzenes that may be used in the present invention may be mentioned propylbenzene, isopropylbenzene, n-butylbenzene, isobutylbenzene, tertiary butylbenzene, para isopropyl toluene, n-amylbenzene, para isobutyltoluene, isohexylbenzene, n-hexylbenzene, n-heptylbenzene, n-dodecylbenzene, n-tetradecylbenzene, n-pentadecylbenzene and n-hexadecylbenzene. The commercial alkylbenzenes which comprise a mixture of alkylbenzenes are also useful for the purpose of the present invention. A typical material of this type is the "dodecylbenzene" having an approximate molecular weight of 240–250 and a boiling point from 270 to 320 deg. C. produced by the alkylation of benzene with tetrapropylene using an alkylation catalyst such as $BF_3$, $H_2SO_4$ or $AlCl_3$. This comprises a mixture of $C_{12}$ alkylbenzenes, $C_{24}$ alkylbenzenes and $C_3$ alkylbenzene. The alkylbenzenes so produced may be separated and used individually.

The pourable paste concentrate of the present invention may comprise a normally liquid hydrocarbon vehicle having intimately dispersed therein a powdered additive for a petroleum product and a relatively small amount of an alkylbenzene whose alkyl radicals contain from 3 to 24 carbon atoms in the chain, said concentrate containing from 97% to 35% by weight of said liquid hydrocarbon, from 1% to 50% by weight of said additive and from 2% to 15% by weight of said alkylbenzene.

The pourable pastes of the present invention may have the following composition:

|  | Percent by weight of total composition |
|---|---|
| Alkylbenzene | 2 to 10 |
| Additive | 15 to 50 |
| Hydrocarbon liquid | 83 to 40 |

In the preferred forms of the invention it has the following composition:

|  | Percent by weight of total composition |
|---|---|
| Alkylbenzene | 5 |
| Additive | 25 to 30 |
| Hydrocarbon liquid | 65 to 70 |

Thus, for example, a paste prepared in accordance with the present invention contains 5% by weight of the alkylbenzene, and particularly the $C_{12}$ alkylbenzene, 65% to 70% by weight of light lubricating oil and 25% to 30% by weight of dyestuff.

The materials used in the present invention may be mixed in any suitable manner in an apparatus designed to mix viscous materials. In one preferred procedure the alkylbenzene in an amount to constitute 5% by weight of the final product is added to a composition containing enough powdered additive for petroleum products to constitute 25% to 30% of the final product and a portion of the light lubricating oil present in the final product. Only a portion of the light lubricating oil is employed at this point so as to give a high viscosity mix in order that the advantage of viscous sheer be utilized during the mixing operation to reduce the particle size. The mixture is mixed using a heavy duty sigma type mixer, for example, for a short time, preferably thirty to sixty minutes until the particle size is sufficiently reduced. The rest of the light lubricating oil is then added to bring the mix down to an additive content of about 25% to 30%.

In another procedure the ingredients to be used are all added at once to a mixing tank. The feed from this tank is piped to a high speed impact grinder where it is ground and mixed for a suitable period, for example sixty to ninety minutes.

The following examples are given to further illustrate the present invention. In the examples given below the lubricating oil employed and designated as "lubricating oil 10 SAE" is identified by the following specifications:

| | |
|---|---|
| Coastal oil type gravity | 22. |
| Fire point | 415. |
| Flash | 370. |
| Color, ASTM | 3½–4¼. |
| Pour point | 0. |
| Viscosity | 100 deg. |
| ASTM | 200–210. |

The kerosene employed in the examples below has the following typical specifications:

| | |
|---|---|
| A.P.I. gravity | 41. |
| Distills | 320 to 550 deg. F. |
| Flash point | 115 deg. F. |
| Color | 21. |
| Saybolt thermo viscosity @ 60 deg. F. | 325–425. |

The "alkylbenzene $C_{12}$" in the examples below is a commercial alkylbenzene prepared by the alkylation of benzene with commercial tetrapropylene using borontrifluoride as a catalyst. The commercial tetrapropylene employed for this purpose has the following specifications:

| | |
|---|---|
| Unsaturates | 97%. |
| Specific gravity | 0.76–0.78. |
| Distillation, deg. F. | 350–445. |
| Bromine number | 105. |
| Flash | 162 deg. F. |

The alkylbenzene produced in this reaction is predominantly a $C_{12}$ alkylbenzene. However, it also contains $C_{24}$ alkylbenzenes which result from the polymerization of the tetrapropylene during the condensation with benzene. The $C_{24}$ alkylbenzenes are known in the art as "heavy aromatic naptha" which has the following specifications:

| | |
|---|---|
| Specific gravity | .874–.876. |
| Distillation at 5 millimeters | 189 deg. upwards of 219 deg. C. |
| Average molecular weight | 392. |

This is identified in the example below as "Alkyl Benzene (Alkyl $C_{42}$)."

The alkylbenzenes so prepared also contain a small amount of $C_3$ alkylbenzenes which result from the depolymerization of the tetrapropylene during its condensation with the benzenes. These $C_3$ alkylbenzenes have a specific gravity of 0.820 and distill between 150 deg. to 215 deg. C. This is identified in the examples below as "Alkyl Benzene (Alkyl $C_3$)."

*Example 1.—Red Pourable Paste, 25% Dye Content*

| | Lbs. |
|---|---|
| Methyl derivatives of azobenzene-azo-2-napthol | 125 |
| Light lubricating oil 10 SAE | 350 |
| Alkylbenzene $C_{12}$ | 25 |

The above quantities of dye and alkylbenzene are added to a portion of the lubricating oil to produce a 50–60% solid content paste. The mass is mixed in a heavy duty sigma type mixer for a half hour to 2 hours until the mass is uniform and the dye dispersed. Then the balance of the lubricating oil is added to produce a 25% solid content paste. The mass is then a thin fluid, easily pourable and rapidly soluble in either lubricating oil or gasoline.

*Example 2.—Yellow Pourable Paste, 25% Dye Content*

| | Lbs. |
|---|---|
| Para dimethylamino azobenzene | 125 |
| Lubricating oil 10 SAE | 350 |
| Alkylbenzene $C_{12}$ | 25 |

Method of mixing as in Example 1.

*Example 3.—Blue Pourable Paste, 25% Dye Content*

| | Lbs. |
|---|---|
| 1.4-di(isopropylamino anthraquinone) | 125 |
| Lubricating oil 10 SAE | 350 |
| Alkylbenzene $C_{12}$ | 25 |

Method of mixing as in Example 1. A thin pourable blue paste is produced, rapidly and easily soluble in either gasoline or oil.

*Example 4.—Orange Paste*

| | Lbs. |
|---|---|
| Phenyl azo-2-napthol | 125 |
| Lubricating oil 10 SAE | 375 |
| Alkylbenzene $C_{12}$ | 25 |

Method of mixing as in Example 1. A thin, pourable paste is produced in 30 minutes to 1 hour.

*Example 5.—Purple Paste*

| | Lbs. |
|---|---|
| 1-hydroxy-4-p-toluido anthraquinone | 125 |
| Lubricating oil 10 SAE | 375 |
| Alkylbenzene $C_{12}$ | 25 |

Method of mixing as in Example 1. A thin, pourable paste is produced, rapidly and easily soluble in gasoline or lubricating oil.

*Example 6.—Red Pourable Paste, 25% Dye Content*

| | Lbs. |
|---|---|
| Methyl derivatives of azobenzene-azo-2-napthol | 125 |
| Lubricating oil 10 SAE | 350 |
| Alkylbenzene $C_{12}$ | 25 |

All of the above ingredients are added at one time to a mixing tank. The feed from this tank is piped to a high speed impact grinder where it is mixed and ground. Time for a grind of 1000 lbs. pourable concentrate including recycling, 1 hour to 1½ hours. The paste thus formed is equally thin and pourable as that prepared using the mixing method of Example 1.

*Examples 7 to 10*

Using the mixing procedure described in Example 6, the pourable paste is made with the compositions of Examples 2 to 5.

*Examples 11 to 16*

The composition and mixing method of Examples 1 to 5 are employed excepting that in each instance the lubricating oil 10 SAE is partly replaced by a proportion of kerosene, usually 5%. The products prepared in this manner are somewhat thinner pourable pastes than that obtained through the use of the lubricating oil employed in the above examples.

*Example 17.—Red Pourable Concentrate*

| | Lbs. |
|---|---|
| Lub. oil 10 SAE | 216 |
| Alkyl Benzene (Alkyl C₃) | 24 |
| Methyl derivatives of benzene azo benzene azo napthol | 80 |

Pass through impact grinder recycling 30 minutes. Product then pourable concentrate.

*Example 18.—Orange Pourable Concentrate*

| | Lbs. |
|---|---|
| Lub. oil 10 SAE | 116 |
| Alkyl Benzene (Alkyl C₂₄) | 4 |
| Phenyl azo 2-napthol | 40 |

Impact grinder 20 minutes. Pourable paste somewhat more viscous than lower alkyl benzene mixtures.

*Example 19.—Red Pourable Concentrate*

| | Lbs. |
|---|---|
| Lub. oil 10 SAE | 104 |
| Kerosene | 8 |
| Tertiary butyl benzene | 8 |
| Methyl derivatives of benzene azo-benzene-azo-napthol | 40 |

Impact grind 30 minutes produces pourable concentrate.

*Example 20.—Yellow Pourable Concentrate*

| | Lbs. |
|---|---|
| Lub. oil 10 SAE | 224 |
| Isopropyl benzene (cumene) | 16 |
| Para dimethyl amino azo-benzene | 80 |

Impact grind 20 minutes. Will produce a pourable concentrate.

*Example 21.—Purple Pourable Concentrate*

| | Lbs. |
|---|---|
| Lub. oil 10 SAE | 112 |
| N-butyl benzene | 8 |
| 1-hydroxy 4 toluido-anthraquinone | 40 |

Impact grind 30 minutes. Will produce a more viscous pourable concentrate.

*Example 22.—Blue Pourable Concentrate*

| | Lbs. |
|---|---|
| Lub. oil 10 SAE | 116 |
| Secondary butyl benzene | 4 |
| 1.4-di-isopropyl amino-anthraquinone | 40 |

Impact grind 15 minutes for a thin pourable concentrate.

Other petroleum product additives may be used in place of the specific dyes in the above examples. Thus tertiary butyl phenol, phenyl naphthylamines, hydroquinone, dihydroxy anthraquinone and other pulverulent or crystaline additives which are slowly dispersible or slowly soluble as well as other ignition controllers, antioxidants, scavengers and stabilizers which are solids or powders may be employed.

Any liquid hydrocarbon vehicle may be used in place of the lubricating oils and kerosene mentioned in the above examples. These liquid hydrocarbons need only be able to act as a medium wherein the additives may be dispersed and be soluble in the petroleum product to which they are to be added. Among these may be mentioned mineral spirits, seal and fuel oil, hydrocarbon jet fuels and petroleum greases.

Further examples to illustrate the use in the invention are the following:

HYDROQUINONE CONCENTRATES=ANTIOXIDANT, GUM INHIBITOR, STABILIZER

*Example 23*

| | Gm. |
|---|---|
| Light lube oil | 56 |
| Kerosene | 56 |
| Alkylbenzene (isopropyl) | 8 |
| Hydroquinone | 40 |

Blend 15 minutes.

*Example 24*

| | Gm. |
|---|---|
| Kerosene | 112 |
| Alkylbenzene (n-tetradecyl) | 8 |
| Hydroquinone | 40 |

Blend 15 minutes.

*Example 25*

| | Gm. |
|---|---|
| Stoddard solvent | 112 |
| Alkylbenzene (n-tetracosyl) | 8 |
| Hydroquinone | 40 |

Blend 15 minutes.

*Example 26*

| | Gm. |
|---|---|
| Seal oil (Texas Co.) | 112 |
| Alkylbenzene (n-dodecyl) | 8 |
| Hydroquinone | 40 |

Blend 15 minutes.

*Example 27*

| | Gm. |
|---|---|
| Seal oil (Texas Co.) | 70 |
| Alkylbenzene (tert butyl) | 10 |
| Hydroquinone | 50 |

Blend 10 minutes then reduce with 70 grams seal oil. Blend 5 minutes more.

*Example 28*

| | Lbs. |
|---|---|
| Light lube oil | 28 |
| Alkylbenzene (tert butyl) | 2 |
| Hydroquinone crystals | 10 |

Thru impact pulverizer using screen #0000 recirculating ½ hour.

*Example 29*

| | Lbs. |
|---|---|
| Kerosene | 28 |
| Alkylbenzene (isobutyl) | 4 |
| Hydroquinone crystals | 20 |

One half hour in impact pulverizer cut back with 28 lbs. kerosene.

CONCENTRATES OF 2,2¹-METHYLENE BIS-4-METHYL-6-TERTIARY BUTYL PHENOL (BIS-PHENOL)

*Example 30*

| | Gm. |
|---|---|
| Kerosene | 112 |
| Alkylbenzene (n-heptyl) | 8 |
| Bis phenol | 40 |

Blend 15 minutes.

*Example 31*

| | Gm. |
|---|---|
| Stoddard solvent | 112 |
| Alkylbenzene (n-propyl) | 8 |
| Bis phenol | 40 |

Blend 20 minutes.

Example 32

| | Gm. |
|---|---|
| Seal oil | 112 |
| Alkylbenzene (n-hexadecyl) | 8 |
| Bis phenol | 40 |

Blend 20 minutes.

CONCENTRATES OF 2.5-DITERTIARY BUTYL HYDROQUINONE

Example 33

| | Gm. |
|---|---|
| Light lube oil | 56 |
| Kerosene | 56 |
| Alkylbenzene (n-pentadecyl) | 8 |
| 2.5-tertiary butyl hydroquinone | 40 |

Blend 15 minutes.

Example 34

| | Gm. |
|---|---|
| Kerosene | 112 |
| Alkylbenzene (isopropyl) | 8 |
| Di-tert butyl hydroquinone | 40 |

Blend 15 minutes.

Example 35

| | Gm. |
|---|---|
| Stoddard solvent | 112 |
| Alkylbenzene (n-dodecyl) | 8 |
| Di-tertiary butyl hydroquinone | 40 |

Blend 15 minutes.

Example 36

| | Gm. |
|---|---|
| Seal oil | 112 |
| Alkylbenzene (isoamyl) | 8 |
| Di-tertiary butyl hydroquinone | 40 |

Blend 10 minutes.

CONCENTRATES OF 4-TERTIARY BUTYL CATECHOL

Example 37

| | Gm. |
|---|---|
| Kerosene | 112 |
| Alkylbenzene (para isopropyl toluene) | 8 |
| Tertiary butyl catechol | 40 |

Blend 15 minutes.

Example 38

| | Gm. |
|---|---|
| Stoddard solvent | 112 |
| Alkylbenzene (isohexyl) | 8 |
| Tertiary butyl catechol | 40 |

Blend 15 minutes.

Example 39

| | Gm. |
|---|---|
| Seal oil | 112 |
| Alkylbenzene (n-heptyl) | 8 |
| 4-tertiary butyl catechol | 40 |

Blend 12 minutes.

CONCENTRATES OF PHENYL ALPHA NAPTHYLAMINE

Example 40

| | Gm. |
|---|---|
| Kerosene | 112 |
| Alkylbenzene (n-tricosyl) | 8 |
| Phenyl alpha napthylamine | 40 |

Blend 5 minutes.

Example 41

| | Gm. |
|---|---|
| Stoddard solvent | 112 |
| Alkylbenzene (n-pentadecyl) | 8 |
| Phenyl alpha napthylamine | 40 |

Blend 5 minutes.

Example 42

| | Gm. |
|---|---|
| Seal oil | 112 |
| Alkylbenzene (isopropyl) | 8 |
| Phenyl alpha napthylamine | 40 |

Blend 5 minutes.

Example 43

| | Gm. |
|---|---|
| Seal oil | 80 |
| Alkylbenzene (n-propyl) | 8 |
| Phenyl alpha napthylamine | 40 |

Blend 3 minutes then cut back with 32 gm. seal oil and blend 2 minutes more.

Example 44

| | Lbs. |
|---|---|
| Light lube oil | 28 |
| Alkylbenzene (n-amyl) | 2 |
| Phenyl alpha napthylamine | 10 |

3 minutes thru impact pulverizer.

Example 45

| | Lbs. |
|---|---|
| Kerosene | 28 |
| Alkylbenzene (isoamyl) | 2 |
| Phenyl alpha napthylamine | 10 |

Three minutes thru impact pulverizer, cut back with 8 lbs. kerosene and put thru two to five minutes more.

CONCENTRATES OF 1.4-DIHYDROXY ANTHRAQUINONE

Example 46

| | Gm. |
|---|---|
| Seal oil | 112 |
| Alkylbenzene (n-hexadecyl) | 8 |
| 1.4-dihydroxy anthraquinone | 40 |

Blend 3 minutes.

Example 47

| | Gm. |
|---|---|
| Stoddard solvent | 112 |
| Alkylbenzene (n-butyl) | 8 |
| 1.4-dihydroxy anthraquinone | 40 |

Blend 4 to 5 minutes.

Example 48

| | Gm. |
|---|---|
| Kerosene | 112 |
| Alkylbenzene (tertiary butyl) | 8 |
| 1.4-dihydroxy anthraquinone | 40 |

Blend 5 minutes.

Example 49

| | Lbs. |
|---|---|
| Kerosene | 28 |
| Alkylbenzene (n-dodecyl) | 2 |
| 1.4-dihydroxy anthraquinone | 10 |

Put thru impact pulverizer for 5 minutes.

DYE CONCENTRATES WITH VARIOUS VEHICLES

Example 50.—Yellow

| | Lbs. |
|---|---|
| Kerosene | 81 |
| Alkylbenzene (n-tetradecyl) | 6 |
| Stearic acid | 3 |
| Benzene azo dimethyl aniline | 31 |

Pass 15 minutes thru impact pulverizer.

Example 51.—Red

| | Lbs. |
|---|---|
| Amino azo toluene azo B-napthol | 125 |
| Alkylbenzene (isohexyl) | 25 |
| Kerosene | 350 |

Pass 15 minutes thru impact pulverizer.

Example 52.—Orange

| | Lbs. |
|---|---|
| Kerosene | 74½ |
| Alkylbenzene (n-dodecyl) | 5 |
| Ortho toluol azo B-napthol | 26 |

Pass 5 minutes thru impact pulverizer.

Example 53.—Red

| | Gm. |
|---|---|
| Mineral spirits | 112 |
| Alkylbenzene (n-hexadecyl) | 8 |
| Amino azo toluene azo B-napthol | 40 |

Blend 5 minutes.

Example 54

| | Gm. |
|---|---|
| Seal oil | 112 |
| Alkylbenzene (isopropyl) | 8 |
| Amino azo toluene azo B-napthol | 40 |

Blend 2 minutes.

Example 55

| | Gm. |
|---|---|
| Fuel oil #2 grade | 112 |
| Alkylbenzene (para isopropyl toluene) | 8 |
| Amino azo toluene azo B-napthol | 40 |

Blend 2 minutes.

Example 56.—Orange

| | Gm. |
|---|---|
| Stoddard solvent | 112 |
| Alkylbenzene (n-tricosyl) | 8 |
| Toluene azo B-napthol | 40 |

Blend 1 minute.

This application is a continuation in part of my application, Serial #652,694, filed April 15, 1957, for Fluidized Petroleum Additives or Concentrates, now abandoned.

I have described what I believe to be the best embodiments of my invention. I do not wish, however, to be confined to the embodiments shown, but what I desire to cover by Letters Patent is set forth in the appended claims.

What is claimed is:

1. A pourable paste concentrate consisting essentially of a mineral oil vehicle having intimately dispersed therein a powdered organic additive selected from the class consisting of dyes, antioxidants, gum inhibitors, ignition controllers, scavengers, anti-rust compounds and stabilizers, and a relatively small amount of alkylbenzene whose alkyl radicals contain from 3 to 24 carbon atoms in the chain, said concentrate containing from 97% to 35% by weight of said mineral oil, from 1% to 50% by weight of said powdered additive and from 2% to 15% by weight of said alkylbenzene, said powdered additive being slowly dispersible in petroleum products and dispersible in said mineral oil and said mineral oil being soluble in said petroleum products.

2. A pourable paste concentrate useful as an additive for petroleum products consisting essentially of a mineral oil vehicle having intimately dispersed therein a powdered organic additive selected from the class consisting of dyes, antioxidants, gum inhibitors, ignition controllers, scavengers, anti-rust compounds and stabilizers, and a small amount of alkylbenzene having from 3 to 24 carbon atoms in the alkyl chain, said mineral oil constituting about 65% to 70% by weight of said concentrate, said powdered additive constituting about 25% to 30% by weight of said concentrate and said alkylbenzene constituting about 5% by weight of said concentrate, said powdered additive being slowly dispersible in petroleum products and dispersible in said mineral oil, and said mineral oil being soluble in said petroleum products.

3. A composition according to claim 2 wherein said mineral oil is a mineral lubricating oil.

4. A composition according to claim 2 wherein said alkylbenzene is a mixture of alkylbenzenes.

5. A composition according to claim 2 wherein said alkylbenzenes are predominantly alkylbenzenes having 12 carbon atoms in the alkyl chain.

6. A composition according to claim 2 wherein said mineral oil vehicle constitutes a mixture of mineral lubricating oil and kerosene.

7. A pourable paste concentrate consisting essentially of a mineral oil vehicle having intimately dispersed therein a powdered dye, and a relatively small amount of alkylbenzene whose alkyl radicals contain from 3 to 24 carbon atoms in the chain, said concentrate containing from 97% to 35% by weight of said mineral oil, from 1% to 50% by weight of said dye and from 2% to 15% by weight of said alkylbenzene, said dye being slowly dispersible in petroleum products and dispersible in said mineral oil and said mineral oil being soluble in said petroleum products.

8. A pourable paste concentrate useful as an additive for petroleum products consisting essentially of a mineral oil vehicle having intimately dispersed therein a powdered dye and a small amount of alkylbenzene having from 3 to 24 carbon atoms in the alkyl chain, said mineral oil constituting about 65% to 70% by weight of said concentrate, said dye constituting about 25% to 30% by weight of said concentrate and said alkylbenzene constituting about 5% by weight of said concentrate, said dye being slowly dispersible in petroleum products and dispersible in said mineral oil, and said mineral oil being soluble in said petroleum products.

9. A compostion according to claim 8 wherein said mineral oil is a mineral lubricating oil.

10. A composition according to claim 8 wherein said alkylbenzene is a mixture of alkylbenzenes.

11. A composition according to claim 8 wherein said alkylbenzenes are predominately alkylbenzenes having 12 carbon atoms in the alkyl chain.

12. A composition according to claim 8 wherein said mineral oil vehicle constitutes a mixture of mineral lubricating oil and kerosene.

References Cited in the file of this patent

UNITED STATES PATENTS

| | | |
|---|---|---|
| 1,803,008 | Ellis et al. | Apr. 28, 1931 |
| 1,884,431 | Watson et al. | Oct. 25, 1932 |
| 1,962,564 | Kuhrmann et al. | June 12, 1934 |
| 2,090,484 | Ostromislensky | Aug. 17, 1937 |
| 2,224,904 | Elley et al. | Dec. 17, 1940 |
| 2,265,189 | Orelup | Dec. 9, 1941 |
| 2,346,780 | Orelup | Apr. 18, 1944 |
| 2,604,494 | Morris et al. | July 22, 1952 |
| 2,618,384 | Hatfield | Nov. 18, 1952 |

FOREIGN PATENTS

| | | |
|---|---|---|
| 492,946 | Canada | May 19, 1953 |

OTHER REFERENCES

"Uses and Applications of Chemicals and Related Materials," by Gregory, Reinhold Pub. Co., copyright 1939, p. 489.